(12) United States Patent
Fuerst et al.

(10) Patent No.: US 6,247,823 B1
(45) Date of Patent: Jun. 19, 2001

(54) OUTSIDE REAR VIEW MIRROR WITH SEALED CHAMBER

(75) Inventors: Peter Fuerst, Bügstadt; Harald Buchalla, Amorbach; Klaus Schnellbach, Freudenberg; Hans-Joachim Fuchs, Dorfprozelten, all of (DE)

(73) Assignee: Donnelly Hohe GmbH & Co. KG (DE)

( * ) Notice: Subject to any disclaimer, the term of this patent is extended or adjusted under 35 U.S.C. 154(b) by 0 days.

(21) Appl. No.: 09/597,678

(22) Filed: Jun. 20, 2000

(51) Int. Cl.[7] .................................................. G02B 7/182
(52) U.S. Cl. .................... 359/871; 359/872; 359/873; 359/877; 359/878
(58) Field of Search .................... 359/871, 872, 359/873, 877, 878

(56) References Cited

U.S. PATENT DOCUMENTS

| | | | |
|---|---|---|---|
| 3,945,714 | * 3/1976 | Walter | 359/871 |
| 4,696,555 | 9/1987 | Enomoto | 359/871 |
| 4,936,671 | 6/1990 | Kaspar | 359/871 |
| 5,579,178 | * 11/1996 | Mochizuki | 359/841 |
| 5,691,849 | * 11/1997 | Ledroit et al. | 359/603 |
| 5,900,999 | * 5/1999 | Huizenga et al. | 359/877 |
| 5,984,483 | * 11/1999 | Mazurek et al. | 359/872 |
| 6,019,475 | 2/2000 | Lynam et al. | 359/879 |

FOREIGN PATENT DOCUMENTS

| | | |
|---|---|---|
| 39 13 776 A1 | 10/1990 | (DE) . |
| 39 14 334 A1 | 10/1990 | (DE) . |
| 40 22 019 C2 | 1/1991 | (DE) . |
| 197 36 482 A1 | 2/1998 | (DE) . |
| 0 331 744 A1 | 9/1989 | (EP) . |
| 0 379 193 A1 | 7/1990 | (EP) . |
| 0 395 052 A1 | 10/1990 | (EP) . |
| 0 496 155 A2 | 7/1992 | (EP) . |

* cited by examiner

Primary Examiner—Mohammad Sikder
(74) Attorney, Agent, or Firm—McGlew and Tuttle, P.C.

(57) ABSTRACT

An outside rear view mirror for a motor vehicle includes a mirror element, a housing and a mirror foot fastenable to the motor vehicle. At least one electrical function element, in particular a contacting element, is provided in the outside rear view mirror. In order in a simple manner to protect the function element (9, 19, 20, 29, 30, 31) from moisture and dirt, there is provided in the outside rear view mirror (1) a sealable chamber (5), in which the electrical function element (9, 19, 20, 29, 30, 31) may be disposed.

9 Claims, 3 Drawing Sheets

OUTSIDE REAR VIEW MIRROR WITH SEALED CHAMBER

FIELD OF THE INVENTION

The invention relates to an outside rear view mirror for a motor vehicle, comprising a mirror element, a housing and a mirror base or foot fastenable to the motor vehicle.

BACKGROUND OF THE INVENTION

Modern outside rear view mirrors of motor vehicles are equipped with a plurality of electrical functions such as, for example, electric mirror adjusting mechanisms, mirror heating systems or lighting elements. Each as individual electric module, in order to function, has to be electrically cabled. For cabling, single core cables or a plurality of single-core cables combined into a cable harness are used. The cables, for their connection to the vehicle electrical system, are run from the interior of the vehicle into the outside mirror and are contacted there at the various modules.

Functioning of the electrical components in the outside rear view mirror is guaranteed only if moisture is prevented from penetrating into the various electrical function elements. Here, the points of contact where the single-core cables are contacted at the components are particularly at risk if moisture penetrates. As said points of contact are not produced until during assembly, special moisture protected isolating points have to be provided. It is customary to use, for said purpose, specially fashioned plug-in contacts which are protected by correspondingly fashioned protective sleeves, which additional protective sleeves and the more complicated assembly entail a considerable outlay.

A drawback of the known outside mirrors is therefore that the electrical function elements installed in the outside mirror may be protected from moisture or dirt penetration only with a high outlay.

SUMMARY AND OBJECTS OF THE INVENTION

The object of the present invention is to provide an outside rear view mirror of the type described, which in a simple manner guarantees reliable protection of electrical function elements from moisture penetration.

According to the invention, there is provided in the outside rear view mirror a sealable chamber, in which at least one electrical function element may be disposed. By disposing the at least one electrical function in the sealable chamber of this present invention, the at least one electrical function is maintained dry, and is protected against environmental elements such as rain, water and debris due to road splash, water from car washes and the like. This means that all of the moisture sensitive function elements of the outside rear view mirror, such as electronic components or separable plug-in contacts, may be installed in the sealed chamber. By sealing the sealed chamber after the parts to be protected have been installed in the sealed chamber, the moisture protection of all function elements disposed in the sealed chamber is guaranteed at once, so that it is possible to dispense with protective measures, such as protective sleeves, for protecting the individual function elements. It is also optionally possible substantially to dispense with costly measures intended to prevent moisture penetration into the housing of the rear view mirror as a whole because the moisture protection for the endangered components may be guaranteed by the sealed chamber. It is also possible to dispense with the use of expensive moisture-protected isolating points for contacting of the individual function elements because the contacting is effected by means of points of contact which are adequately protected from moisture in the sealed chamber. Inside the outside rear view mirror the sealed chamber therefore provides a limited space, the interior of which may be protected from moisture by simple means and which may therefore protect a plurality of function elements simultaneously from moisture and dirt. Also and preferably, the sealed chamber is provided either as a removable module, or with an access port or lid allowing service access to the at least one electrical function when it is disposed within the sealed chamber.

According to the invention, the sealed chamber may in principle have any desired geometry and be composed of any desired number of parts. It is particularly advantageous when the scaled chamber comprises a bottom part and a lid fastenable to the latter, thus facilitating service access. Said lid may be designed in the manner of a plate or have a different, feasibly also three-dimensional geometry. During assembly of the outside rear view mirror, the function elements to be protected are installed in the bottom part and/or the lid and then the lid is fastened on the bottom part. The lid for its fastening may for example, in the case of detachable fastening, be fastened with screws or clipped into place with mechanical fasteners or, in the case of non-detachable fastening, be fastened by adhesion.

Dividing the sealed chamber into a bottom part and a lid gives rise to a parting line between bottom part and lid, where the two parts come to lie one against the other. For the configuration of bottom part and lid, it is particularly advantageous when the parting line arising therefrom is substantially annular in shape because an annular parting line allows sealing of the sealed chamber by simple means. To said end, the bottom part may for example be designed in the manner of a cylinder, which is closed at one end and the open end of which is closable by a circular cover plate. Depending on the electrical function elements to be installed, the sealed chamber may however have any other shape, in particular other cross sections, because rectangular cross sections, for example, offer particularly advantageous fastening options.

Particularly reliable moisture protection may be achieved when at least one sealing element, in particular a sealing ring, is disposed in the parting line between lid and bottom part. The provision of sealing elements by means of a dispenser is also conceivable.

To supply the electrical components in the outside rear view mirror from the vehicle electrical system, cables are run from the interior of the vehicle into the housing of the outside rear view mirror. When the separable contacting elements and/or the points of contact of other electrical function elements are disposed in the sealed chamber, the various electric cables have to be run from outside into the interior of the sealed chamber. In such case, the penetration of the cables through the housing of the sealed chamber naturally likewise has to guarantee adequate moisture protection. This may be achieved particularly easily when there are disposed in the parting line between lid and bottom part two at least slightly deformable sealing elements, which may be applied sealingly one against the other when the sealed chamber is closed. It is possible for such purpose to provide, for example, one sealing ring on the lid and one sealing ring opposite it on the bottom part. Between the two sealing elements a cable, in particular a ribbon cable, may then be laid from outside into the interior of the sealed chamber without impairing the imperviousness of the sealed chamber. As a material for the opposing seals a permanently elastic material, e.g. cross-linked silicone, and/or a permanently ductile material e.g. bitumen or silicone-impregnated fleece, may be used.

Upon mounting of the lid on the bottom part the opposing sealing elements are pressed against one another, wherein the viscosity of the two sealing elements is so selected that a cable situated between the seals is sealingly enclosed. In this manner, ribbon cables or even flexible printed-circuit boards may be sealed particularly well. Fixing the cables in the parting line between lid and bottom part moreover guarantees a defined cable routing, with the result that the assembly of other components in the outside rear view mirror is facilitated. For, by virtue of the defined cable routing, pinching of the cables between two other components may be ruled out. In principle, to guarantee the imperviousness of the sealed chamber so as to maintain its interior cavity substantially dry, it is sufficient for the parting line to be sealed with a suitable sealing element. Where necessary, an additional labyrinth seal or a protective collar may be provided in or in front of the parting line outside of the sealed chamber. By means of such additional seal the sealed chamber may be protected from particularly extreme influences such as arise, for example, during the operation of high-pressure cleaning appliances. The penetration of cables through the labyrinth seal or past the protective collar is not a problem because the opposing surfaces of lid and bottom part in the region of the labyrinth seal and/or the protective collar are not applied one against the other.

It is naturally possible for the sealed chamber to be designed as an independent component and installed as such in the interior of the mirror housing. The outlay for the provision of various components of an outside rear view mirror and/or the assembly outlay may however be reduced when the lid or the bottom part of the sealed chamber is integrated integrally in a carrier plate of the outside rear view mirror. Such carrier plates are used in outside rear view mirrors in many models, wherein the carrier plate lends the outside rear view mirror its mechanical stability and other components of the outside rear view mirror, such as e.g. drive motors, the adjusting mechanism, or the housing are fastenable to the carrier plate. The bottom part of the sealed chamber, for example, may be integrated in the carrier plate by working a suitable recess in the carrier plate or placing a continuous circumferential web onto the carrier plate. The space thus created in the carrier plate is open at one end and may then be closed, for example, by a suitable lid.

It is advantageously possible to dispense with the lid or the bottom part of the sealed chamber as an independent component when the lid or bottom part is formed substantially by the side of a mirror-adjusting mechanism provided in the outside rear view mirror, which side lies opposite the fastening element for fixing the mirror element to the mirror-adjusting mechanism. The mirror-adjusting mechanism, when it is installed in the outside rear view mirror, is placed with the appropriate side sealingly on the bottom part or lid of the sealed chamber so that the sealed chamber, after fastening of the adjusting mechanism, is sealed. Naturally, in said case it is particularly advantageous when the bottom part of the sealed chamber is integrated in the carrier plate of the outside rear view mirror and the lid of the sealed chamber takes the form of one side of the adjusting mechanism. This design eliminates the need for most of the additional parts for realizing the sealed chamber according to the invention because the main function elements of the sealed chamber, namely bottom part and lid, axe integrated in existing components. The need for additional assembly operations is likewise eliminated because the mirror-adjusting mechanism has in any case to be fastened to the carrier plate.

Assembly of the outside rear view mirror is further simplified when contacting elements, in particular plug-in contacts, are provided in each case on the lid and in the interior of the bottom part in an arrangement which allows contacting of the opposing contacting elements when the lid is mounted on the bottom part. For example, it is possible for such purpose to integrate a multipole connector in the side of the mirror glassy adjusting mechanism directed towards the sealed chamber. A functionally complementary connector is moreover provided in the interior of a bottom part, which is integrated in the carrier plate of the outside rear view mirror. When the mirror-adjusting mechanism is mounted on the carrier plate, the opposing connectors may then be simultaneously contacted with one another by means of a simple joining motion without additional assembly outlay. By virtue of the arrangement inside the sealed chamber, adequate moisture protection is moreover guaranteed. It is therefore possible to dispense with further lines for connection of the mirror-adjusting mechanism. In order that the two connector halves may be reliably joined, it is advantageous to provide centering lugs, with the aid of which the joining motion of the two components may be guided.

In new types of motor vehicle, the individual electrical components are no longer each individually activated via separate cables from the vehicle electrical system. To reduce the number of cables needed for the wiring of the motor vehicle, in such motor vehicles a data bus system is used instead. The signals for controlling the various components are in this case transmitted via a common data line in the vehicle. These control signals of the data bus are received in electronic components which convert the digital control commands into analogue control signals, by means of which the electrical components are activated. When in a module such as the outside rear view mirror a plurality of electrical components are provided, a nodal point is preferably formed, which is connected to the data bus system of the motor vehicle. The electronic component, which forms the nodal point, in this case converts the various digital control commands from the data bus into analogue control signals for a plurality of electrical components, which therefore all have to be contacted inside the outside mirror to the nodal point. This therefore gives rise inside the module to a star-shaped structure, at the center of which lies the nodal point, from which electric feeder cables extend to the individual electrical components. Individual contacting of the various electrical components inside the outside rear view mirror with the nodal point requires a considerable outlay for moisture-protected connectors and a high assembly outlay and takes up a great deal of space. It is also difficult to design such a concept in a modular and/or vehicle-independent manner because different variants require different interfaces. Given use of a data bus system in the motor vehicle, it is therefore particularly advantageous when the nodal point to be provided in the outside rear view mirror, i.e. the electronic component to be provided for said purpose, is disposed inside the sealed chamber. As a result, the electronic component itself and at the same time a plurality of connectors required for contacting the various components with the nodal point in the sealed chamber may be reliably protected from moisture. There is no longer any need for high-cost moisture-protected electronic components. Where in simpler vehicle variants a data bus system is not used, instead of the electronic module a simple printed circuit board with suitable connectors may be disposed in the sealed chamber in order to simplify assembly and guarantee reliable protection from moisture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
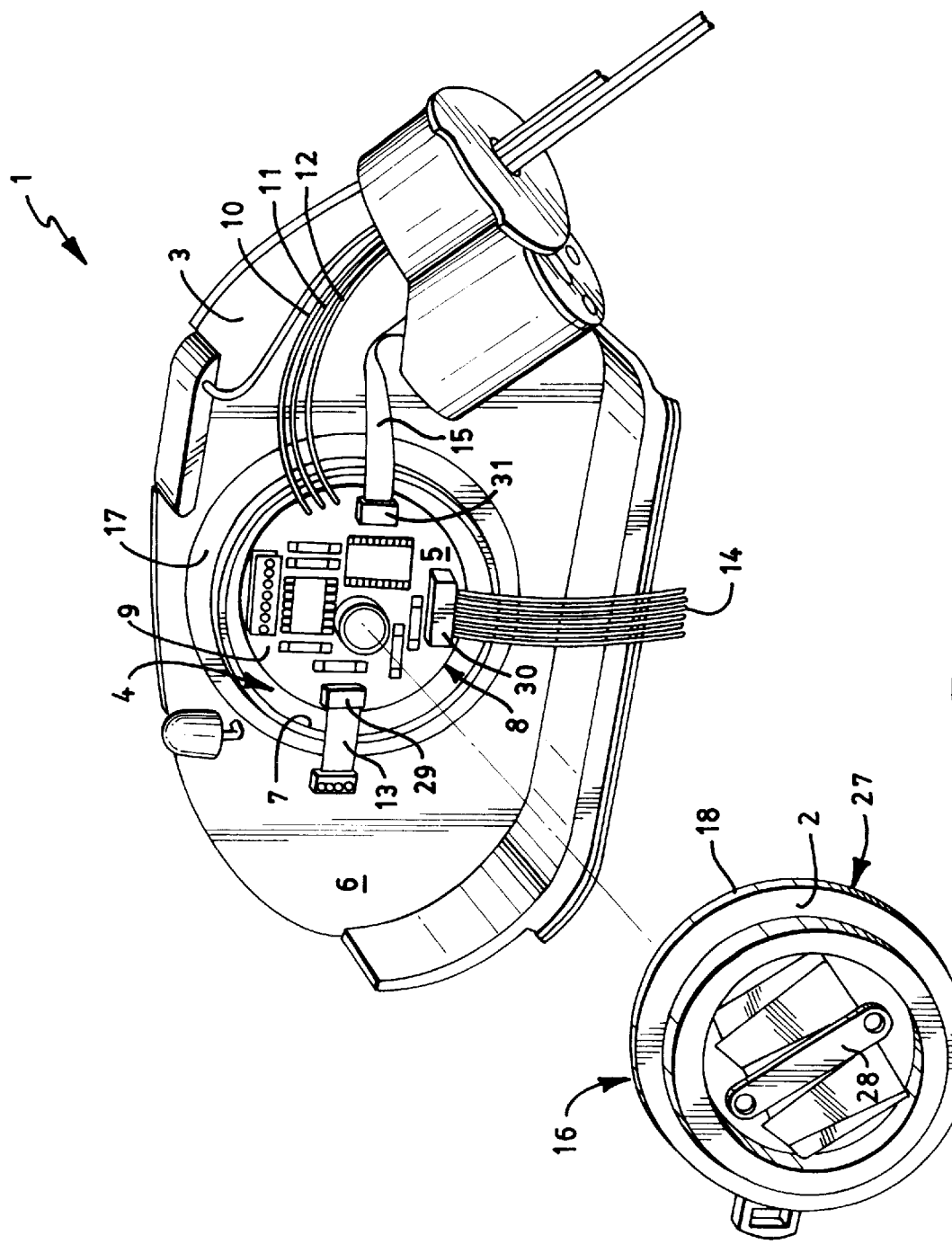
FIG. 1 is an outside rear view mirror with mirror-adjusting mechanism in an exploded perspective view.

Referring to the drawings in particular, FIG. 1 shows an outside rear view mirror 1 with a mirror-adjusting mechanism 2 in a perspective view. For improved clarity, the glass module, the housing and the mirror foot of the outside tear view mirror 1 are not shown. The various components of the outside rear view mirror 1 may be mounted on a carrier plate 3. The center of the carrier plate 3 is in said case designed as the bottom part 4 of a sealed chamber 5 (see FIG. 3). To create the bottom part 4 of the sealed chamber 5, a recess is provided in the basic plane 6 of the carrier plate 3 so that the bottom part 4 of the sealed chamber 5 is delimited laterally by an annular circumferential web 7 and in a downward direction by an, in the drawing, concealed base 8.

In an upward direction, the sealed chamber 5 is initially open so that an electronic bus unit 9 may be introduced into the bottom part 4 of the sealed chamber 5 and fastened to its base 8. The electronic bus unit 9 is supplied by means of the supply lines 10 and 11 with operating current and via the data line 12 with digital control commands from a data bus system of the motor vehicle. In the electronic bus unit 9, which is designed as the nodal point of the data bus system, the digital control commands are converted into analogue electrical actuating signals and relayed via the plug-in contacts 29, 30 and 31 and the ribbon cables 13, 14 and 15 to the do various, partially non-illustrated electrical components in the outside rear view mirror.

After installation of the ribbon cables 13, 14 and 15, of which the plug-in connectors to the electronic bus unit 9 are not of a moisture-protected design, the mirror-adjusting mechanism 2 is mounted by its underside 16, which lies opposite the fastening element 28 for fixing a non-illustrated mirror element to the mirror-adjusting mechanism 2 and hence forms the lid 27 of the sealed chamber 5, on the carrier plate 3. For sealing the sealed chamber 5, planar sealing rings 17 and 18 are provided on the carrier plate 3 and on the mirror-adjusting mechanists 2 respectively. When the mirror-adjusting mechanism 2 is fastened on the carrier plate 3, the two planar sealing rings 17 and 18 are applied one against the other and therefore seal the sealed chamber 5. The cables 10, 11, 12, 13, 14 and 15 extend from outside, between the two planar sealing rings 17 and 18 and into the interior of the sealed chamber 5.

Figure 2:
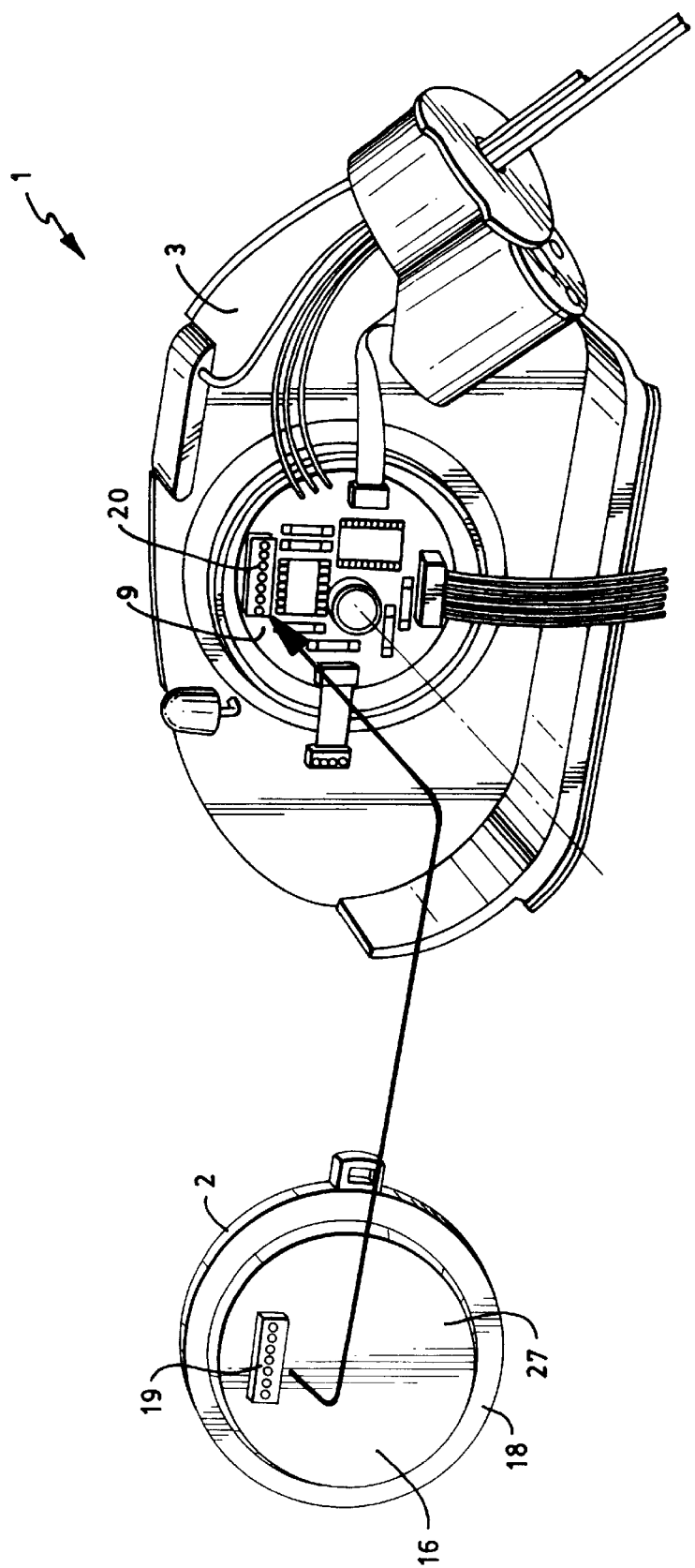
FIG. 2 is an outside mirror according to FIG. 1 in a second exploded perspective view.

FIG. 2 shows the outside rear view mirror 1 with the carrier plate 3, the sealed chamber 5 and the mirror-adjusting mechanism 2, of which the underside 16 may be seen in a front view in FIG. 2. It is evident from said view that a multipole connector 19 is disposed on the underside 16 of the mirror-adjusting mechanism 2. During the joining motion for fastening the mirror-adjusting mechanism 2 to the carrier plate 3, said multipole connector 19 is contacted with a multipole connector 20 on the electronic bus unit 9. Consequently, the electrical contacting of the drive motors and position sensors provided in the mirror-adjusting mechanism 2 is possible without installing additional cables by simply fastening the mirror-adjusting mechanism 2 to the carrier plate 3.

Figure 5:
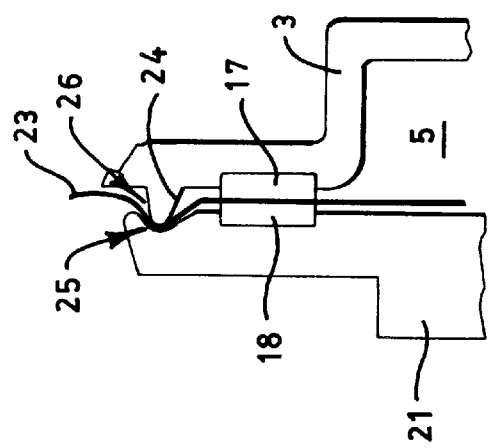
FIG. 5 is a third embodiment of a parting line of a sealed chamber according to the invention in cross section.
Figure 4:
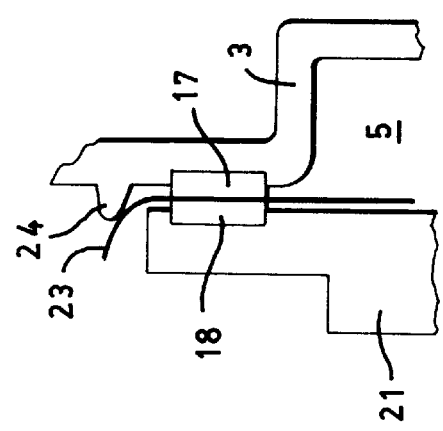
FIG. 4 is a second embodiment of a parting line of a sealed chamber according to the invention in cross section.
Figure 3:
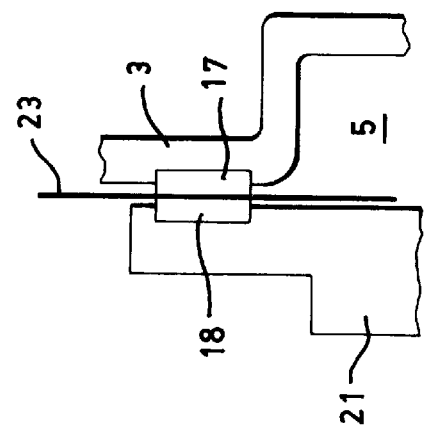
FIG. 3 is a first embodiment of a parting line of a sealed chamber according to the invention in cross section.

FIG. 3, FIG. 4 and FIG. 5 show various embodiments of the design of the sealing joint between the carrier plate 3 and a lid 21. For sealing of the sealed chamber 5 with simultaneous penetration by cables 23, in each case two planar sealing rings 17 and 18 are provided between the carrier plate 3 and the lid 21. The sealing according to the embodiment in FIG. 3 comprises no further sealing elements. In the embodiment according to FIG. 4, in addition to the planar sealing rings 17 and 18 a protective 5 collar 24 is provided to rule out the direct action of a liquid jet upon the sealing rings 17 and 18.

An even better sealing effect may be achieved by the embodiment according to FIG. 5, which additionally comprises a labyrinth seal 26. The labyrinth seal 26 is formed e.g. by the protective collar 24 and a recess 25 of a complementary shape in the lid 21.

While specific embodiments of the invention have been shown and described in detail to illustrate the application of the principles of the invention, it will be understood that the invention may be embodied otherwise without departing from such principles.

What is claimed is:

1. An outside rear view mirror for a motor vehicle, the rear view mirror comprising:

a carrier plate mountable in a mirror housing of said rearview mirror, said carrier plate having a surface and said carrier plate including a recess provided at said surface of said carrier plate, said recess having a closed bottom part and sides with an upper portion with an opening, said bottom and sides delimiting said recess at a base and at sides;

a lid, said lid being fastened in a sealing manner to said upper portion so as to close said opening in a sealing manner defining a sealed chamber;

at least one electrical function element, said at least one electrical functional element including at least one contacting element, said at least one electrical functional element being disposed in said recess of said carrier plate.

2. An outside rear view mirror as claimed in claim 1, wherein a parting line between said lid and said bottom part is substantially annular in shape.

3. An outside rear view mirror as claimed in claim 2, wherein said structure includes at least one sealing element in the form of a sealing ring disposed in said parting line between said lid and said bottom part.

4. An outside rear view mirror as claimed in claim 2, further comprising: two at least slightly deformable sealing elements disposed in the parting line between said lid and said bottom part, wherein when the sealed chamber is closed, said two at least slightly deformable sealing elements applied sealingly one against the other, wherein between said two at least slightly deformable sealing elements at least one ribbon cable is installable from outside into the interior of the sealed chamber.

5. An outside rear view mirror as claimed claim 2, further comprising one of a labyrinth seal and a protective collar is provided in the parting line outside of the sealed chamber.

6. An outside rear view mirror as claimed in claim 1, wherein said bottom part said sealed chamber is integrated integrally in a carrier plate of the outside rear view mirror, to which carrier plate various function elements of the outside rear view mirror are fastenable.

7. An outside rear view mirror as claimed in claim 1, further comprising a fastening element for fixing a mirror element to a mirror-adjusting mechanism, wherein said lid of said sealed chamber is formed substantially by a side of a mirror-adjusting mechanism, which side lies opposite said fastening element.

8. An outside rear view mirror as claimed in claim 1, further comprising:

at least one plug-in contact contacting element and an opposing contacting element, said plug-in contact contacting element being disposed in such a way that, when said lid is mounted on said bottom part, said opposing contacting element is contactable wherein on said lid and in the interior of the bottom part in each case at least one contacting element, in particular a plug-in contact, is disposed in such a way that, when the lid is mounted on the bottom part, the opposing contacting elements are contactable.

9. An outside rear view mirror as claimed in claim 1, wherein disposed in the interior of the sealed chamber is an electronic component, which forms a nodal point of a data bus system in the motor vehicle and from which various function elements in the outside rear view mirror may be activated.

* * * * *